(12) United States Patent
Butler

(10) Patent No.: US 12,361,236 B2
(45) Date of Patent: Jul. 15, 2025

(54) RFID READ ZONE MAPPING, TESTING, AND MONITORING USING A SILENT RFID TAG

(71) Applicant: T-Mobile Innovations LLC, Overland Park, KS (US)

(72) Inventor: Robert Keith Butler, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/460,352

(22) Filed: Sep. 1, 2023

(65) Prior Publication Data
US 2025/0077808 A1    Mar. 6, 2025

(51) Int. Cl.
G06K 7/10    (2006.01)
(52) U.S. Cl.
CPC ................... G06K 7/10366 (2013.01)
(58) Field of Classification Search
CPC ............. G06K 7/10366; G06K 7/10475
USPC ............................................... 235/451
See application file for complete search history.

(56) References Cited

U.S. PATENT DOCUMENTS

| | | |
|---|---|---|
| 11,915,085 B2 | 2/2024 | Grant et al. |
| 11,922,255 B2 | 3/2024 | Biswas et al. |
| 2006/0049946 A1 | 3/2006 | Sullivan et al. |
| 2010/0148985 A1 | 6/2010 | Lin et al. |
| 2010/0201488 A1 | 8/2010 | Stern et al. |
| 2020/0364421 A1 | 11/2020 | Wappler |
| 2021/0065529 A1 | 3/2021 | Bergman et al. |
| 2023/0177287 A1* | 6/2023 | Austin ............... G06K 7/10099 340/10.1 |
| 2024/0095718 A1* | 3/2024 | McDaniel ............. G07G 1/009 |
| 2024/0220750 A1* | 7/2024 | Frederick ............... H04W 4/80 |
| 2025/0077809 A1 | 3/2025 | Butler |

OTHER PUBLICATIONS

Butler, Robert Keith, "RFID Read Zone Mapping, Testing, and Monitoring Using a Silent RFID Tag," filed Sep. 5, 2023, U.S. Appl. No. 18/461,341.
Ex Parte Quayle Action dated Oct. 18, 2024, U.S. Appl. No. 18/461,341, filed Sep. 5, 2023.
Notice of Allowance dated Feb. 7, 2025, U.S. Appl. No. 18/461,341, filed Sep. 5, 2023.
Foreign Communication From a Related Counterpart Application, EP Extended Search Report and EP Search Opinion dated Apr. 28, 2025, EP Application No. 24195430.4.

* cited by examiner

*Primary Examiner* — Ahshik Kim

(57) ABSTRACT

A communication device includes a central processing unit (CPU); a non-transitory memory; and an RFID application stored on the non-transitory memory and comprising executable instructions that when executed by the CPU, cause the communication device to be configured to provide the communication device in an environment; receive a radio frequency (RF) signal from an RFID reader at a plurality of locations in the industrial environment, wherein the RF signal comprises a frequency in the cellular frequency range; determine a receive signal strength (RSS) of the RF signal at each of the plurality of locations; determine the RSS of the RF signal at each of the plurality of locations; and generate a map of an RFID read zone in the industrial environment based on the RSS of the RF signal at the plurality of locations.

20 Claims, 9 Drawing Sheets

RFID READ ZONE MAPPING, TESTING, AND MONITORING USING A SILENT RFID TAG

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices such as, for example, consumer devices and Machine-to-Machine (M2M) communication devices are widely deployed in a wireless network, such as a cellular network. Consumer devices may include a smart phone, a tablet computer, a wearable computer, or a desktop computer, while M2M devices may include Internet of Things (IoT) devices such as wirelessly connected vehicles, a thermostat, a refrigerator, a water meter, or other similar everyday IoT devices. Cellular networks may exchange wireless signals with mobile communication devices using wireless network protocols. Exemplary wireless network protocols include Institute of Electrical and Electronic Engineers (IEEE) 802.11 (WIFI), Long Term Evolution (LTE), fifth generation (5G) new radio (5GNR), and Low-Power Wide Area Network (LP-WAN).

The deployment of radio frequency identification (RFID) tags has continued to increase in industrial applications such as asset tracking during distribution, use, and storage of assets, and for inventory management in warehouses and distribution centers. RFID is a method of identifying, from a distance, an object that has an RFID tag using radio waves to communicate with the RFID tag. In an example, the RFID tag holds digital information in a microchip. In an example, the RFID reader/RFID scanner communicates with the RFID tag using radio unmodulated waves that are transmitted back with digital information from the RFID tag. When radio frequency (RF) signals from an RF transmitter reach the RFID tag's antenna, the energy in the radio waves is converted by the RFID tag into electricity that can power up the microchip in the RFID tag. The RFID tag is then able to send back information stored on the chip.

SUMMARY

In an embodiment, a communication device for identifying radio frequency identification (RFID) zones in an industrial environment that is suitable for deploying RFID tags is disclosed. The communication device includes a central processing unit (CPU); a non-transitory memory; and an RFID application stored on the non-transitory memory and comprising executable instructions that when executed by the CPU, cause the communication device to be configured to provide the communication device in an environment; receive a radio frequency (RF) signal from an RFID reader at a plurality of locations in the industrial environment, wherein the RF signal comprises a frequency in the cellular frequency range; determine a receive signal strength (RSS) of the RF signal at each of the plurality of locations; determine the RSS of the RF signal at each of the plurality of locations; and generate a map of an RFID read zone in the industrial environment based on the RSS of the RF signal at the plurality of locations.

In another embodiment, a communication device for receiving radio frequency identification (RFID) zones in an industrial environment that is suitable for deploying RFID tags is disclosed. The communication device includes a central processing unit (CPU); and a non-transitory memory; and a RFID application stored on the non-transitory memory and comprising executable instructions that when executed by the CPU, cause the communication device to be configured to provide the communication device in an environment; receive a first radio frequency (RF) signal having a first RF power level from an RFID reader at a plurality of locations in the industrial environment; determine a receive signal strength (RSS) of the RF signal at each of the plurality of locations; obtain a map of RF power levels in an RFID read zone in the industrial environment based on the RSS of the RF signal at the plurality of locations, wherein the map of the RFID read zone comprises a subset of the RSS for the plurality of locations; send the map of the RFID read zone to at least one of the RFID reader or an analysis server; obtain, by the RFID reader, a second RF signal based on at least the map of the RF power levels in the RFID read zone, wherein the second RF signal is different from the first RF signal and is based on adjustment of the first RF signal; and receive, from the RFID reader, the second RF signal at one or more locations in the RFID read zone.

In yet another embodiment, a communication device for monitoring radio frequency identification (RFID) zones in an industrial environment that is suitable for deploying RFID tags is disclosed. The communication device comprises a central processing unit (CPU); a non-transitory memory; and a RFID application stored on the non-transitory memory and comprising executable instructions that when executed by the CPU, cause the communication device to be configured to provide the communication device in an environment; receive, from an RFID reader, a radio frequency (RF) signal having a first RF power level at a plurality of locations in the industrial environment, wherein the RF signal comprises a frequency in the cellular frequency range; receive, from an RFID tag in the industrial environment, a radio frequency (RF) backscatter signal at a location in the industrial environment, wherein the backscatter signal comprises a frequency in the cellular frequency range; determine a receive signal strength (RSS) of the RF signal at the location; and receive, from an RFID reader, a list of a plurality of RFID tags in an RFID read zone of the industrial environment; determine the RFID tag is one of the plurality of RFID tags in the list based on the RF backscatter signal; and determine an adjustment of the RF signal at the location based on a determination the RFID tag is not one of the plurality of RFID tags in the list based on the RF backscatter signal.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
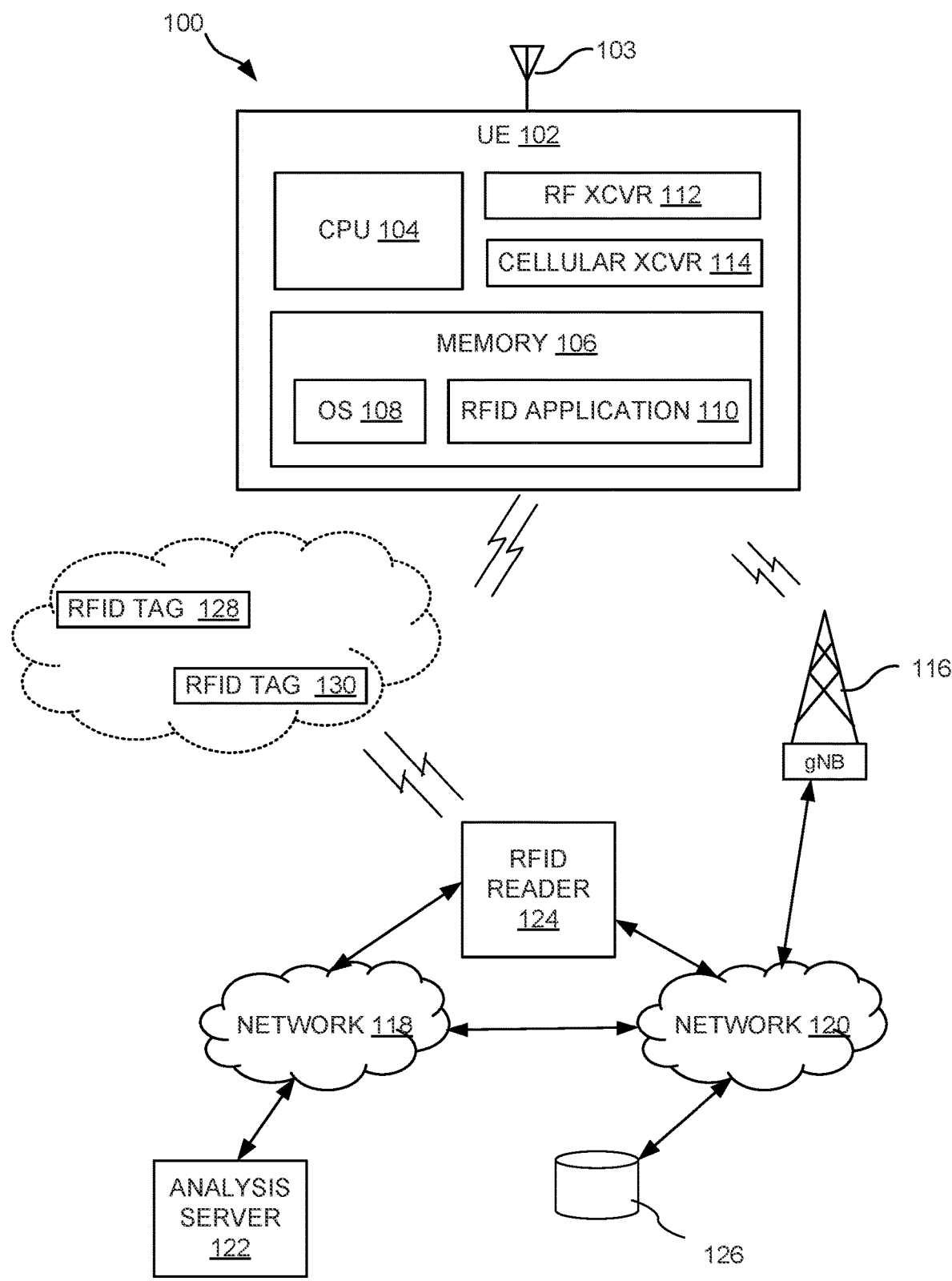
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The deployment of RFID tags (also generally known as an RF tag) has continued to increase in industrial applications for asset tracking and inventory management such as in warehouses, in distribution centers, at construction sites, or other similar industrial applications. In an example, a passive RFID tag captures incident RF signals such as, for example, ultra-high frequency RF signals (for example, UHF or microwave power signals), in a power-up link from a transmitter (usually from an RFID reader) to power-up/ energize the RFID tag and, in response, transmits back an RF signal with information from the RFID tag (for example, as a backscatter signal). As used herein, a backscatter signal is an RF signal with modulation that is transmitted from an RFID tag to an RFID reader based on an incident RF signal that is received at the RFID tag, and does not refer to backscatter signals used in radio detection and ranging (RADAR) applications. In an example, the power-up link is generally a limiting factor in RFID systems as the environment surrounding the RFID tag may impact the power-up signal from being received at the RFID tag or the backscatter signal from being received by the RFID reader.

However, the backscatter signal may not reach the RFID reader due to signal fading through multipath transmission, detuning of RFID tag antennas, metal objects and other similar obstructions in the path between the RFID tag and the RFID reader, interference from other RF sources that are transmitting at the same time, or RFID tag and RFID reader orientation. As a passive RFID tag does not record information about read attempts from the RFID reader or the quality of the communication channel between RFID tag and the RFID reader, quality of the signal may not be obtained from the environment of the RFID tag. Further, the environment of the RFID tag may degrade as metal cabinets, and other metallic objects are moved around, causing RF signals to not be received at an RFID tag in the changed environment that was previously receiving the RF signal or causing backscatter signals to not be received by the RFID reader. To compensate for this degradation the RFID reader may transmit the RF signal at higher RF power, which may cause interference with other RF signals. Further, dedicated test equipment is prohibitively expensive to be installed permanently in order to continually monitor changing conditions in the environment of the RFID tags.

As disclosed herein, a method for mapping, testing, and monitoring RFID tags in an environment via a communication device/user equipment (UE) device is provided. In an example, the UE device may be configured to obtain a map of RF signal quality in an environment where RFID tags are deployed and/or RFID tags may be deployed (for example, inserted into shipping containers, pallets, boxes, in tool housings at construction sites, or other similar objects). In an example the UE device may use RF signals that may be unmodulated RF signals having a frequency in the cellular spectrum and that are transmitted from an RF transmitter (for example, an RF transmitter located in an RFID reader). In an example, the UE device may be physically moved to different locations within the environment as the UE device actively monitors and obtains, in real-time, the map of RF signal quality in the environment. In an example, when the UE device detects an RF signal at one or more sectors/ locations in the environment that is at least equal to an RF power level (in microwatt ($\mu$W)) that may energize an RFID tag, the UE device may obtain and store the analytical map of these sectors as an RFID read zone that defines where an RFID tag may be located/deployed and may currently receive energizing RF power within the RFID read zone. In another example, when RF signals that are detected at sectors in the RFID tag environment that are below the energizing RF power, the UE device may obtain and store a map of these sectors as an RFID non-read zone that defines where the RFID tag may not be located/deployed. In an example, the UE device may receive RF signals from multiple RFID readers in the environment, and may use the received RF power to determine suitability of deploying RFID tags within the RFID tag environment as read zones and RFID non-read zones. In an example, the map of RF signal quality within the environment may include RF signal values having an RF signal strength for a particular location and for a particular time that the value of the RF signal strength information was measured/collected by the UE device within the environment. In an example the UE device may receive the RF signals from an RFID reader while the UE device is moved around in the RFID tag environment in order to monitor the RF signals in the RFID tag environment. As such, the UE device may act as a "silent" RFID tag whereby RF signals in a power-up link from the RFID reader are collected, without backscatter signals being sent back to the RFID reader (for example, silently monitoring the RF signals). Further, upon receiving the power-up link RF signals while acting as a silent RFID tag, the UE device may obtain signal quality of the RF signals in the RFID tag environment for any type of RFID reader (for example, any manufacturer of the RFID reader) that is deployed in the RFID environment as well as a time and location where the RF signals are received in the RFID tag environment.

In an example, the UE device may send data comprising the map of RF signal quality to the RFID reader for fine tuning the RF power that is transmitted as RF signals in the environment. In an example, the UE device may send the map of RF signal quality in the RFID read zones and the RFID non-read zones of the environment to the RFID reader in order to enable the RFID reader to adjust the RF power of the transmitted RF signal from the RFID reader. In an example, adjusting the power may include adjusting the RF power of the RF signal and directionality of the RF signal that is transmitted in the RFID tag environment. In an example, the UE device may send a map of RF signal quality for all locations/sectors within the RFID tag environment in order to adjust the RF power of the transmitted RF signal upwards or downwards or directionality of the RF power that is transmitted from the RFID reader. In an example, adjusting the RF power may cause energizing RF power to be received at one or more sectors in the RFID tag environment, which may include receiving energizing RF power in RFID read zones and RFID non-read zones of the environment. In an example, the UE device may send a map of RF signal quality in the RFID read zones and the RFID non-read zones to an application server that may analyze the signal strengths and map of the RFID tag environment and, in response, send a command/instruction to the RFID reader to tune/adjust upwards or downwards the energizing RF power in the RFID tag environment. In an example, the command/instruction to the RFID reader instructs the RFID reader to adjust the RF power of the RF signal and directionality of the RF signal that is transmitted in the RFID tag environment that enables fine-tuning the RF power that is transmitted by the RFID reader in the environment. The UE device provides advantages over other solutions as the UE device may improve efficiency of power usage in the RFID tag environment by providing the RF signal quality of each location within the RFID tag environment so that the RFID reader may selectively transmit RF signals at different RF power levels based on the RF signal quality that is detected by the UE device, and avoid transmitting RF power that exceeds what may be needed for any location within the RFID tag environment.

In an example, the UE device may, in real-time, be physically moved to different locations within the RFID tag environment so that UE device obtains, in real-time, the RF power at the location while the RFID reader is transmitting the adjusted RF signal. In an example, the UE device may be in constant communication with the RFID reader via the analysis server as the RF signal is being tuned for the environment. In an example, the RFID reader may transmit RF power at a first level, and may receive feedback from the UE device via the analysis server whether a location of the UE device is receiving RF power within a power level of the energizing RF power. Based on this feedback, the RFID reader may be instructed by the analysis server to increase or decrease the transmitted RF power to a second level.

In an example, the UE device may scan for RFID tags by listening for backscatter signals that may be sent by the RFID tags after energizing RF power is received at the RFID tags. In an example, the UE device may be physically moved within the RFID tag environment while the UE device is receiving the backscatter signals. In an example, the UE device may obtain a list of RFID tags that have communicated with the UE device including their locations in the environment in order to identify RFID tags that are transmitting to the UE device but are not being received by the RFID reader or RFID tags that are known to be deployed in locations but are not transmitting backscatter signals. The UE device may also detect backscatter signals from RFID tags in order to identify whether the RFID tags are able to be identified by the RFID reader. The system described herein provides advantages over conventional solutions whereby a frequently changing RFID tag environment, where RFID tags are deployed or may have to be deployed, may be tested for RF signal quality using a UE device that may receive RF signals from an RFID reader at frequencies transmitted in the cellular spectrum. Further, using the cellular spectrum to transmit the energizing RF power may be more efficient, as transmitted RF power levels and directionality may be selectively controlled for the RFID tag environment which avoids transmitting excess RF power, minimizes interference from other RF signals, and lower noise. Another advantage is that using unmodulated signals to energize RFID tags and subsequently receive the backscatter signals may enable the communication device/user equipment (UE) device to deploy in existing RFID tag environments without requiring significant changes to test equipment for these RFID tag environments. In an example, the UE device may detect RF signal quality in the frequently changing RFID tag environment thereby avoiding the requirement of using prohibitively expensive test equipment every time the RFID tag environment changes. Further, the disclosed system helps manage growth and change of the RFID tag environment when new RFID tags are provisioned in the RFID tag environment for asset tracking during distribution, use, and storage.

Turning now to FIG. 1, a communication system 100 is described according to an embodiment. In an embodiment, the communication system 100 is configured for deploying, testing, and monitoring RFID tags in an environment using a communication device/user equipment (UE). In an example, the environment of the RFID tag may be an industrial application where RFID tags are deployed or may be deployed such as, for example, an environment where RFID tags are used for asset tracking and monitoring in a warehouse, in a distribution center, or at a construction site. In an embodiment, the communication system 100 may be configured to obtain an analytical map of RF signal quality in the environment where RFID tags may be deployed or are deployed (hereinafter "RFID tag environment") based on receive signal strength of RF power that is received at various areas/sectors in the RFID tag environment. In an example, the RFID tag environment may include RFID tags and the UE. In an example, a UE device may be used as RFID test equipment for mapping RF power, testing, and monitoring of RFID tags in the RFID tag environment. In an example the UE device may receive RF signals from an RFID reader while the UE device is moved around in the RFID tag environment in order to silently monitor the RF signals. As such, the UE device may act as a "silent" RFID tag whereby RF signals in a power-up link from the RFID reader are collected, without backscatter signals being sent back to the RFID reader. Further, upon receiving the power-up link RF signals while acting as a silent RFID tag, the UE device may obtain signal quality of the RF signals in the RFID tag environment for any type of RFID reader that is deployed in the RFID environment as well as a time and location where the RF signals are received in the RFID tag environment.

In an embodiment, the communication system 100 may comprise user equipment (UE) 102, cell site 116, a first communication network 118, a second communication network 120, analysis server 122, an RFID reader 124, storage 126, and RFID tags 128 and 130. The UE 102 may be a communication device such as, for example, a smart vehicle, a smart phone, a wearable computer, a personal digital assistant (PDA), a headset computer, a laptop computer, a notebook computer, and a tablet computer that has one or more processors, memory, and transceiver components. The UE 102 may be a fixed communication device or a mobile communication device. In an embodiment, the UE 102 comprises an antenna 103, a central processing unit (CPU) 104, a memory 106 that stores an operating system (OS) 108, an RFID application 110, an RF transceiver 112, and a cellular transceiver 114.

In an embodiment, the antenna 103 may be communicatively coupled to the cellular transceiver 114 and the RF transceiver 112 through a wired connection. The antenna 103 may be coupled to radio frequency (RF) reception and transmission components of the UE 102, and may be part of the cellular transceiver 114 or RF transceiver 112. In an embodiment, the RF transceiver 112 may establish a radio communication link to the first communication network 118 using the antenna 103. In an example, the first communication network 118 comprises the Internet. In an example, the communication link may be established according to a wireless network protocol that includes the IEEE 802.11 (WIFI) protocol. In an embodiment, the cellular transceiver 114 may establish a radio communication link to the cell site 116 using the antenna 103. The radio communication link may be established according to an LTE protocol, a Code Division Multiple Access (CDMA) protocol, a Global System for Mobile Communications (GSM) protocol, or a 5th generation mobile network (5G) telecommunication protocol. In an embodiment, the cellular transceiver 114 includes a 5G RAT that provides an air interface for the UE 102. While not shown in FIG. 1, the cellular radio transceiver 114 may include additional circuit components to process and manipulate the wireless signals at the UE 102.

The memory 106 comprises a non-transitory portion that stores one or more applications for execution by the CPU 104. In embodiments, the memory 106 embeds an operating system (OS) 108 and an RFID application 110. In an embodiment, the OS 108 comprises executable instructions of an OS kernel of the UE 102 that may be executed by the CPU 104 to perform operations such as, for example, operations to manage input/output data requests to the UE 102 (e.g., from software and/or applications of the RFID application 110), translate the requests into instructions (e.g., data processing instructions) for execution by the CPU 104 or other components of the UE 102, manage the UE 102 resources, such as the CPU 104 and the memory 106 when executing and providing services to applications on the UE 102 such as the RFID application 110.

In an embodiment, RFID application 110 may be configured to send and receive messages including reporting messages comprising channel quality information between the UE 102 and the RFID reader 124. In an example, the channel quality information may include receive signal strength (RSS) of RF signals that are received at the UE 102 from one or more devices including the RFID reader 124 and RFID tags 128, 130. In an example, the RFID application 110 may be configured to send reporting messages to an analysis server 122 or to an RFID reader 124 using the first communication network 118 or the second communication network 120. In an example, the RFID application 110 may be configured to execute instructions to cause the cellular transceiver 114 to receive RF signals that are transmitted from the RFID reader 124 and RFID tag 128 or cause the cellular transceiver 114 to transmit RF signals in the cellular spectrum to RFID tags 128, 130, and receive RF signals as backscatter signals (for example, RF signals) from the RFID tags 128, 130.

In an example, the backscatter signals may be modulated RF signals having a frequency in the cellular spectrum. In an example, the RFID application 110 may be configured to obtain a map of RF signal quality within the RFID tag environment that is received by the UE 102. As used herein, a map of RF signal quality within the RFID tag environment may include RF signal values that are measured/collected by the UE 102 at one or more locations in the RFID tag environment. In an example, the locations may be X and Y positions/coordinates relative to the RFID reader 124 in a two-dimensional (2D) area or may be X, Y, and Z positions/coordinates relative to the RFID reader 124 in a three-dimensional (3D) area. In an example, the map may link a value of an RF signal strength to a particular location (for example, a location defined by either X, Y coordinates or X, Y, Z coordinates) and to a particular time (for example, a time measured in a 12-hour or 24-hour format) that the value of the RF signal strength information was measured/collected by the UE 102 within the RFID tag environment. In an example, the map may store measured RF values by superimposing real-time RF signal values at one or more of these locations over previous RF signal values for the same locations within the RFID tag environment as the UE 102 is physically moved around within the RFID tag environment. In an example, the RFID application 110 may include instructions for analyzing the map of RF signal quality and send, in response, reporting data/information to the analysis server 122 and/or the RFID reader 124 via the first communication network 118 and/or the second communication network 120. In an example, the reporting information may include receive signal strengths that are measured by the UE 102 in the RFID tag environment. In an example, the reporting information may include commands/instructions that instruct the RFID reader 124 to adjust/tune the RF power that is transmitted by the RFID reader 124 in the RFID tag environment based on a map of RF signal quality that is measured as a receive signal strength by the UE 102 in the RFID tag environment.

In another example, the RFID application 110 may send the map of RF signal quality to the analysis server 122. In an example, the analysis server 122 may analyze the map of RF signal quality and send, in response, reporting data/information to the RFID reader 124 via the first communication network 118 and/or the second communication network 120. In an example, the reporting information may include receive signal strengths that are measured by the UE 102 in the RFID tag environment. In an example, the reporting information may include commands/instructions that instruct the RFID reader 124 to adjust/tune the RF power that is transmitted by the RFID reader 124 in the RFID tag environment based on a map of RF signal quality that is measured as receive signal strength in the RFID tag environment.

In an example, the RFID reader/interrogator 124 may include one or more antennas and a transceiver. In an example, the RFID reader 124 may transmit RF signals in the cellular spectrum (for example, radio waves) using the transceiver and receive signals back from the RFID tags 128, 130 via the antennas. While FIG. 1 is being described for use with a single RFID reader 124, it is also contemplated that the UE 102 may be used to receive RF signals from multiple RFID readers substantially similar to RFID reader 124 and which are transmitting within the RFID tag environment.

The UE 102 may be communicatively coupled to the cell site 116. The cell site 116 connects the UE 102 to the second communication network 120. The second communication network 120 connects the UE 102 to a first communication network 118, an analysis server 122, RFID reader 124, and database 126. The second communication network 120 may be a core network (for example, a macro network) of a network provider or the Internet Network. In an embodiment, the UE 102 may request 5G services via the cell site 116 of the second communication network 120 using the radio communication link. In examples, the communication between the second communication network 120 and UE 102 may be established according to an LTE protocol, a CDMA protocol, a GSM protocol, or a 5G telecommunication protocol. The second communication network 120 may provide 5G services to the UE 102 using network functions, that include voice, data, and messaging services. The second communication network 120 may be communicatively coupled to analysis server 122 for transmitting reporting information from the UE 102. The second communication network 120 may also be communicatively coupled to a database 126 for storing a map of signal quality including receive signal strength, channel quality and other transmission parameters of RF signals between the RFID reader and the RFID tags 128, 130. The system 100 may comprise additional communication networks similar to second communication network 120 and any number of cell sites 116.

Turning now to FIGS. 2A-2D and with continued reference to FIG. 1, diagrams for mapping, testing, and monitoring RFID tags in an RFID tag environment are described. In an example, the RFID tag environment may be an environment where RFID tags, for example, RFID tags 128, 130 in FIG. 1, are deployed and/or may be deployed for asset tracking and monitoring such as, for example, in a warehouse, a distribution center, or a construction site. In an embodiment, the diagrams in FIGS. 2A-2D illustrate RFID application scenarios where the UE device 210 is implemented as an RFID test equipment for mapping RF signal quality in the RFID tag environment for determining where RFID tags may be deployed and/or have already been deployed. In an example, the UE device 210 may be the UE 102 in FIG. 1. While FIG. 2A-FIG. 2D are being described for use with a single RFID reader 212, it is also contemplated that the UE device 210 may be used to receive RF signals from multiple RFID readers that are substantially similar to RFID reader 212.

Figure 2A:
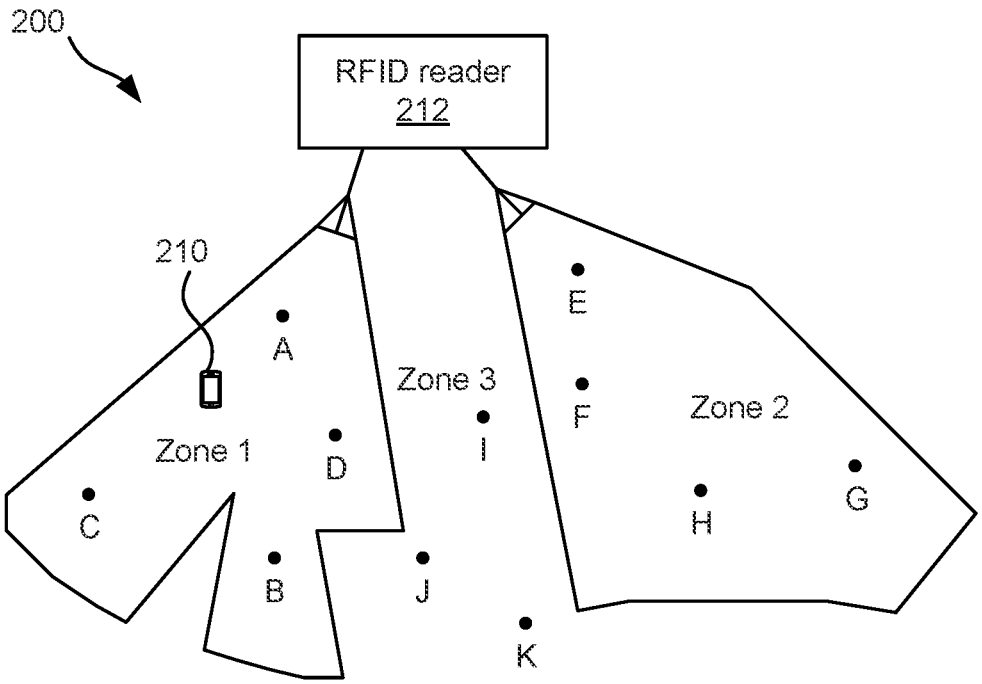
FIG. 2A is a diagram of an RFID application scenario according to an embodiment of the disclosure.

Referring now to FIG. 2A, a diagram 200 is described according to an embodiment. In an embodiment, diagram 200 illustrates an RFID application scenario where the UE device 210 is configured to obtain a map of RF signal quality in read-zones and RFID non-read zones of the RFID tag environment using RF signals that are transmitted from an RF transmitter (for example, an RF transmitter located in the RFID reader 212). In an example, the RF signal may be unmodulated RF signals having a frequency in the cellular spectrum. In examples, the cellular spectrum may include frequencies in the low-band spectrum (for example, frequency below 1 gigahertz (GHz)), mid-band spectrum (for example, frequency between 1 GHZ and 2.6 GHZ), mid-band spectrum (for example, frequency between 3.5 GHZ and 6 GHZ), and high-band spectrum (for example, frequency between 24 GHz and 40 GHZ). In an example, RF signal quality may include RF power, receive signal strength, signal-to-noise ratio (SNR), or similar RF parameters. In an example, the UE device 210 may use the transmitted RF signal to obtain an analytical map of RF signal quality in the RFID tag environment. In an example, a read zone defines locations in the RFID tag environment where RFID tags may be deployed and RFID non-read zones define sectors/locations in the environment 200 where RFID tags may not be deployed. For instance, a read zone may include sectors/locations in the RFID tag environment where RF signals transmitted to an RFID tag may have sufficient power to energize/wake up the RFID tag in order to cause the RFID tag to transmit a backscatter signal to the RFID reader 212. In an example, an RFID non-read zone may include sectors in the RFID tag environment where RF signals transmitted to an RFID tag are not received by the RFID tag or may be received by the RFID tag but not have the requisite power levels for energizing the RFID tag in order to transmit the backscatter signal to the RFID reader 212.

In an example, in order to obtain a map of RF signal quality in the RFID tag environment, the UE device 210 may be physically moved to different locations within the RFID tag environment as the UE device 210 obtains, in real-time, RF signal quality for each location in the RFID tag environment that includes a map of RF signal quality in the read zones and the RFID non-read zones. For instance, a user operating the UE device 210 may selectively move the UE device 210 to different sectors in the RFID tag environment in order to detect and/or receive the RF signals that are transmitted from the RFID reader 212 within the RFID tag environment. In an example, the UE device 210 appears stationary when the RF signal is read in relation to the frequency of the cellular spectrum. In examples, the UE device 210 may be moved to sectors/locations A-K within the RFID tag environment while the UE device 210 actively monitors the RFID tag environment for transmitted RF signals from, for example, the RFID reader 212. In an example, when the UE device 210 detects an RF signal at one or more sectors/locations in the RFID tag environment that is at least equal to an RF power level threshold and that may energize an RFID tag (hereinafter referred to as "energizing RF power"), the UE device 210 may obtain and store an analytical map of RF power at these sectors as an RFID read zone that defines locations where an RFID tag may be located/deployed and may currently receive energizing RF power within the RFID read zone.

In an example, the UE device 210 may obtain data comprising a map of RF signal quality of each location that the UE device 210 is moved within the RFID tag environment. In an example, the map may be used to fine tune the RF power that is transmitted by the RFID reader 212 in the RFID tag environment. In an example, the UE device 210 may send a map of RF signal quality to an application server and/or the RFID reader 212 for analyzing the signal strengths based on the map and, in response, to cause the RFID reader 212 to tune/adjust upwards or downwards the energizing RF power that is transmitted by the RFID reader 212 in the RFID tag environment and/or directionality of the transmitted RF power. In an example, the command/instruction may be sent by the application server to the RFID reader 212 to instruct the RFID reader 212 to adjust the RF power of the RF signal and directionality of the RF signal that is transmitted in the RFID tag environment. In this way, the UE device 210 may improve efficiency of power usage in the RFID tag environment by providing feedback on the RF signal quality for each location in the RFID tag environment in order for the RFID reader 212 to selectively transmit RF signals at different RF power levels and directionality based on the RF signal quality that is detected by the UE device 210. This tuning avoids transmitting RF power that exceeds what may be needed for each location within the RFID tag environment.

In another example, when RF signals that are detected at sectors in the RFID tag environment that are below the RF power level threshold, the UE device 210 may obtain and store a map of these sectors as an RFID non-read zone that defines locations where the RFID tag may not receive energizing RF power and may not be located/deployed. In an example, the energizing RF power may be in the range of 50 micro Watt (W) to 500 µW for a silicon RF integrated circuit (IC) operating in the frequency range of 902 Megahertz (MHz)-928 MHz and may be the amount of RF power coupled into the RFID tag's RFIC discounting any loss factors internal to the RFIC. In example, the UE device 210 may determine, based on the RF power that is received at sectors A-K, that sectors A-D (for example, zone 1) and sectors E-H (for example, zone 2) receive energizing RF power and may be mapped to read zones whereby RFID tags may be deployed. In an example, although each sector in zone 1 and zone 2 may receive energizing RF power, the receive signal strength of the RF power for each sector may be at a different receive signal strength. In another example, the UE device 210 may determine based on the RF power of the RF signal at sectors I-K (for example, zone 3), that sectors I-K within the environment 200 do not receive energizing RF power and may be mapped to RFID non-read zones and are not suitable for deploying/landing RFID tags. In an example, the UE device may receive RF signals from multiple RFID readers in the RFID tag environment, and may use the received RF power to determine suitability of deploying RFID tags within the RFID tag environment based on defining RFID read zones and RFID non-read zones.

In an example, as the RFID tag environment changes with metal obstructions being added to the RFID tag environment, and metal obstructions being removed from the RFID tag environment, the UE device 210 may be easily and efficiently dispatched to generate another map of the RF signal quality in the changed RFID tag environment. For instance, the UE device 210 may again be deployed in the changed RFID tag environment and be physically moved to different locations within the changed RFID tag environment as the UE device 210 obtains, in real-time, RF signal quality for each location the UE device 210 is stationary in the RFID tag environment. In this way, the UE device 210 may function to detect RF signal quality in the initial RFID tag environment and also for a frequently changing RFID tag environment thereby avoiding the requirement of using prohibitively expensive test equipment every time the RFID tag environment changes. Further, processing efficiency is also improved with a reliable band of information with less signal drops and disconnects as a current map of the RF signal quality may be obtained with the UE device 210, and that may be fine-tuned in the changing RFID tag environment.

Figure 2B:
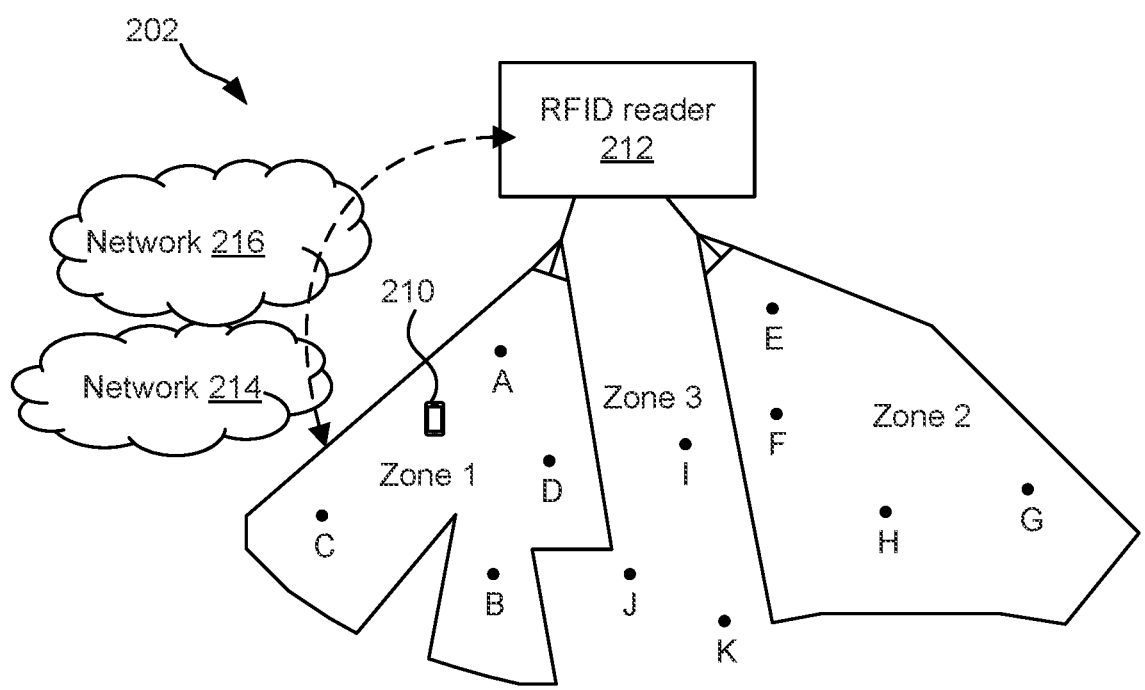
FIG. 2B is a diagram of an RFID application scenario according to an embodiment of the disclosure.

Referring now to FIG. 2B, a diagram 202 is described according to an embodiment. In an embodiment, diagram 202 illustrates an RFID application scenario that is substantially similar to diagram 200 in FIG. 2A where the UE device 210 obtains the map of RF signal quality of the RFID tag environment, however, diagram 202 includes an RFID application scenario where the UE device 210 sends data comprising the map of RF signal quality to the RFID reader 212 for fine tuning the RF power that is transmitted from the RFID reader 212 as RF signals in the RFID tag environment. In an example, the UE device 210 may send the map of RF signal quality in the RFID read zones and the RFID non-read zones of the RFID tag environment to the RFID reader 212 via network 214 or network 216 in order to enable the RFID reader 212 to adjust the RF power of the transmitted RF signal from the RFID reader 212. In an example, adjusting the RF power may cause energizing RF power to be received at one or more sectors in the RFID tag environment, which may include adjusting RF power in RFID read zones and RFID non-read zones of the RFID tag environment. In an example, network 214 may be a local area network (LAN) or the Internet, and network 216 may be a cellular network of a mobile network operator (MNO). In an example, the UE device 210 may transmit data comprising the map of the RF power that is received for each location in the zones (for example, zones 1, 2, and 3) such that the RFID reader 212 may tune the RF power of the transmitted RF signal to increase/decrease the RF power based on the receive signal strength at the UE device 210.

In some examples, the RFID reader 212 may analyze the information received on the RF signal quality for the RFID read zones and RFID non-read zones in order to obtain adjustments to the RF power that is to be transmitted within the RFID tag environment and the directionality of the RF power that is to be transmitted within the RFID tag environment using the information received on the RF signal quality for the RFID read zones and RFID non-read zones. In an example, the adjustments may include adjusting directionality of the transmitted RF signal (for example, using beamforming or physically changing the angle of one or more antennas) to change the angle of transmission of the RF power in RFID read zones and RFID non-read zones and/or increasing or decreasing the RF power (in µW) in RFID read zones and RFID non-read zones. In an example, the RFID reader 212 may iteratively adjust the RF power level of the transmitted RF signal to one or more values and/or the directionality of the transmitted RF signal based on feedback received from the UE device 210 for each iteration so that the RSS of the RF power of the adjusted RF signal that is received at a location within the RFID tag environment may fall within the range of the energizing RF power for energizing an RFID tag when deployed at the location within the RFID read zone and not interfere with other RF signals at other locations within the RFID tag environment. While the RFID read zones may receive energizing RF power, adjustments to the RF power may be made for all zones (RFID read zones and RFID non-read zones) in order to increase the coverage of RFID read zones within the RFID tag environment.

Figure 2C:
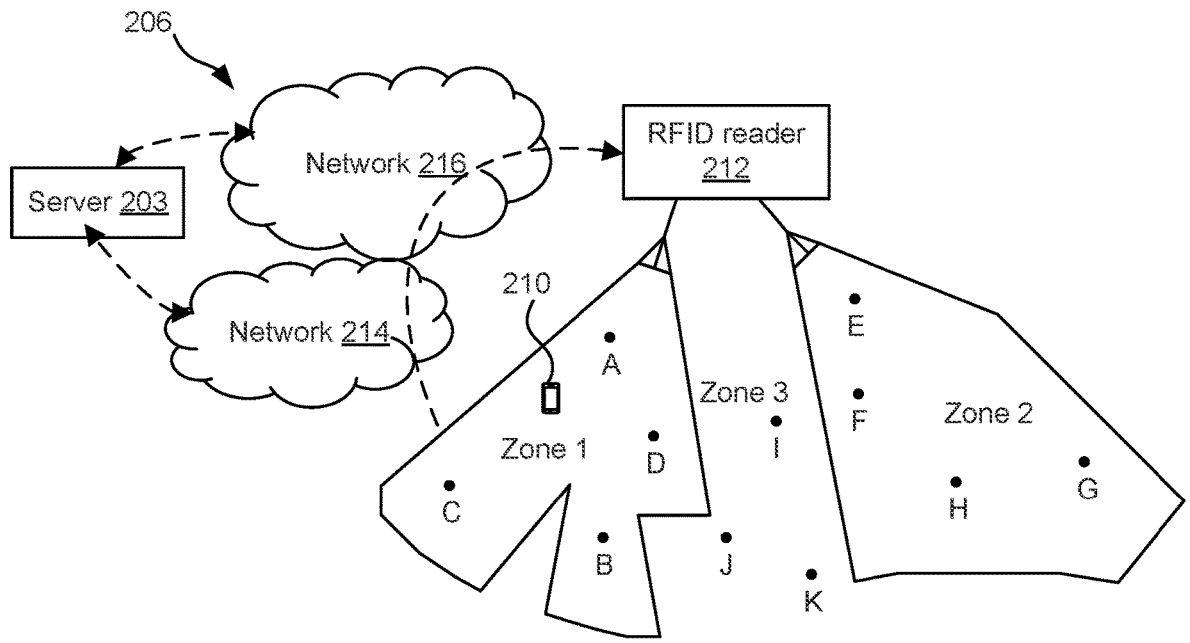
FIG. 2C is a diagram of an RFID application scenario according to an embodiment of the disclosure.

Referring now to FIG. 2C, a diagram 206 is described according to an embodiment. In an embodiment, diagram 206 illustrates an RFID application scenario that is substantially similar to diagram 204 in FIG. 2B, however the UE device 210 in diagram 206 sends data comprising the map of RF signal quality in the RFID read zones and the RFID non-read zones to the application server 203 for fine-tuning/ minor increasing or minor decreasing the RF power in the RFID tag environment. In an example, the application server 203 may be application server 122 in FIG. 1. In an example, the UE device 210 may send a map of RF signal quality in the RFID read zones and the RFID non-read zones in an RFID tag environment including receive signal strengths of the RF power to application server 203 via network 214 or network 216. In an example, application server 203 may analyze the signal strengths and map of the RFID tag environment and, in response, send a command/instruction to the RFID reader 212 to fine tune the energizing RF power in the RFID tag environment. In an example, the command/ instruction to the RFID reader 212 instructs the RFID reader 212 to adjust the RF power of the RF signal and directionality of the RF signal that is transmitted in the RFID tag environment. In an example, the UE device 210 may, in real-time, be physically moved to different locations within the RFID tag environment so that UE device 210 obtains, in real-time, the RF power at the location while the RFID reader 212 is transmitting the adjusted RF signal. In an example, the UE device 210 may be in constant communication with the RFID reader 212 via the analysis server 203 as the RF signal is being tuned for the RFID tag environment.

In an example, the RFID reader 212 may transmit RF power at a first level, and may receive feedback from the UE device 210 via the analysis server 203 whether a location of the UE device 210 is receiving RF power within a power level of the energizing RF power. Based on this feedback, the RFID reader 212 may be instructed by the analysis server 203 to increase the transmitted RF power to a second level. In another example, the analysis server 203 may instruct the RFID reader 212 to decrease the RF power that is transmitted if excess RF power is being received by the UE device 210.

In an embodiment, the UE device 210 may coordinate with the RFID reader 212 for monitoring RFID tags that have been deployed in the RFID tag environment. In an example, the UE device 210 may receive a list of RFID tags that are located in the RFID tag environment from the analysis server 203 or the RFID reader 212 and that are communicating with the RFID reader 212 based on backscatter signals that are received from the RFID tags. In an example, the RFID reader 212 may send the list to the UE device 210 in order for the UE device 210 to locate the RFID tags that are communicating with the RFID reader 212 via RF signals transmitted by the RFID reader 212 as well as to locate any other RFID tags whose backscatter signals are not being received by the RFID reader 212. In an example, the UE device 210 may scan for RFID tags by listening for backscatter signals that may be sent by RFID tags after energizing RF power is received at the RFID tags from the RFID reader 212. In an example, the UE device 210 may be physically moved within the RFID tag environment while the UE device 210 is receiving the backscatter signals in order to avoid interference from metal structures and from other RF signals.

In an example, the UE device 210 may obtain a second list of RFID tags whose backscatter signals are not being received by the RFID reader 212 but are being received by the UE device 210. The second list may include the location of the RFID tags in the RFID tag environment in order to identify RFID tags that are transmitting backscatter signals but are not being received by the RFID reader 212. In an example, using the backscatter signals that are being received from the RFID tags but are not being received by the RFID reader 212 may be addressed by relocating the RFID tags to more suitable locations within the RFID tag environment thereby avoiding interference from metal structures and from other RF signals. As used herein, a more suitable location enables the RFID tag to receive an energizing RF signal from the RFID reader 212 and whose backscatter signal may be received by the RFID reader 212. In this way, the UE device 210 may be used to identify and correct latent problems that may develop as the RFID tag environment changes from metal structures and other interferences are inserted and/or removed within the RFID tag environment.

In another example, the second list of RFID tags may include locations where RFID tags are known to be deployed but are not transmitting backscatter signals, such as if the RFID tags are damaged. In an example, the UE device 210 may send the second list to the RFID reader 212 for analysis, including determining whether to increase transmitted RF power, change directionality of the transmitted RF power, physically move the RFID tag to another location, or the like. In an example, the UE device 210 may send the second list to the analysis server 122 to enable the analysis server 122 to determine whether the RF power from the RFID reader 212 is to be adjusted, changing directionality of the transmitted RF power, or replacing the RFID tag.

Figure 2D:
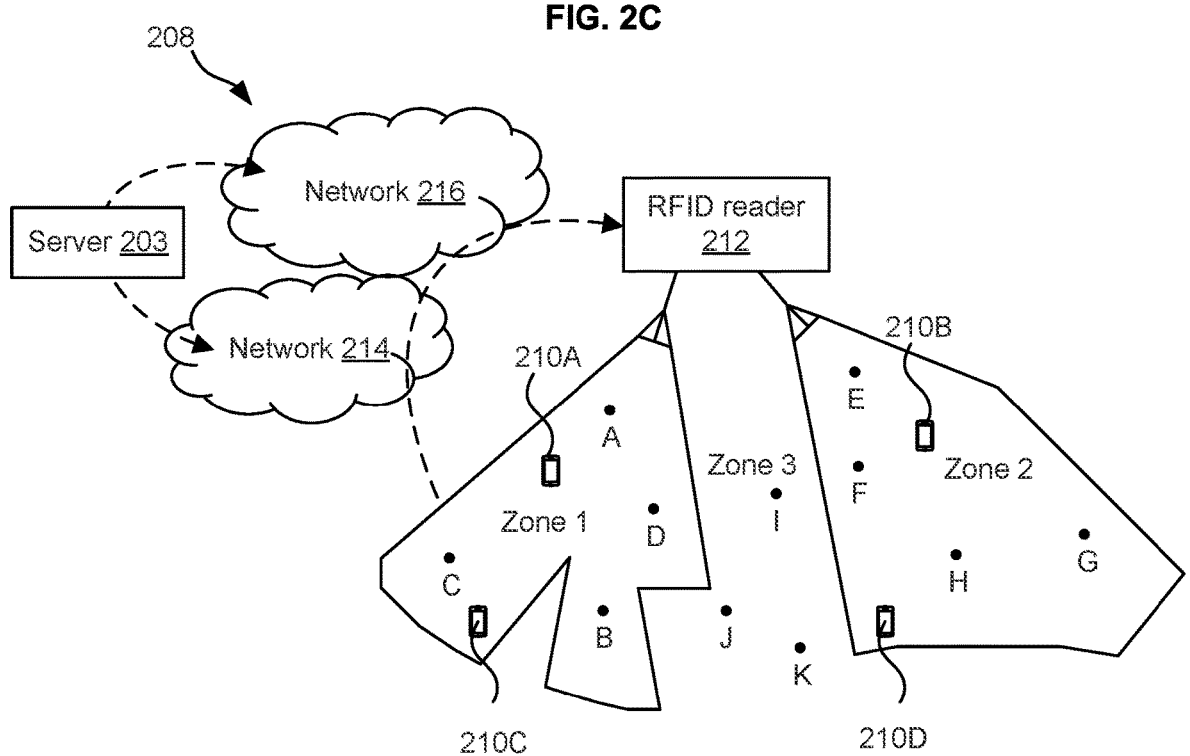
FIG. 2D is a diagram of an RFID application scenario according to an embodiment of the disclosure.

Referring now to FIG. 2D, a diagram 208 is described according to an embodiment. In an embodiment, diagram 208 illustrates an RFID application scenario that is substantially similar to FIG. 2B and FIG. 2C, however the diagram 208 includes a plurality of UE devices 210A-210D within the RFID tag environment that are communicating with the RFID reader 212 and the application server 203. In an example, the UE devices 210A-210D may be a stationary device and/or a portable device or a combination of stationary devices and portable devices within the RFID tag environment. In an example, the UE devices 210A-210D may obtain, in real-time, RF signal quality for each location in the RFID tag environment that UE devices 210A-210D are located. In an example, obtaining the RF signal quality includes obtaining a map of RF signal quality in the RFID read zones and the RFID non-read zones by each UE device from the UE devices 210A-210D. For instance, a user operating the UE devices 210A-210D may selectively move the UE devices 210A-210D to different sectors in the RFID tag environment in order to detect and/or receive the RF signals that are transmitted from the RFID reader 212 within the RFID tag environment. In an example, the RFID read zones obtained by one UE device may overlap an RFID read zone obtained by a second and different UE device. In an example, the UE devices 210A-210D may send their maps of RF signal quality in the RFID read zones and the RFID non-read zones in RFID tag environment including receive signal strengths of the RF power to application server 203 via network 214 or network 216. In an example, application server 203 may analyze the signal strengths and maps of the RFID tag environment and, in response, send a command/instruction to the RFID reader 212 to fine tune the energizing RF power in the RFID tag environment. In an example, the command/instruction to the RFID reader 212 instructs the RFID reader 212 to adjust the RF power of the RF signal and directionality of the RF signal that is transmitted in the RFID tag environment. In an example, the UE devices 210A-210D may, in real-time, be physically moved to different locations within the RFID tag environment so that UE devices 210A-210D obtain, in real-time, the RF power at the location while the RFID reader 212 is transmitting the adjusted RF signal. In an example, the UE devices 210A-210D may be in constant communication with the RFID reader 212 via the analysis server 203 as the RF signal is being tuned for the RFID tag environment. In an example, the RFID reader 212 may transmit RF power at a first level, and may receive feedback from the UE devices 210A-210D via the analysis server 203 whether a location of the UE devices 210A-210D is receiving RF power within a power level of the energizing RF power. Based on this feedback, the RFID reader 212 may be instructed by the analysis server 203 to increase the transmitted RF power to a second level. In another example, the analysis server 203 may instruct the RFID reader 212 to decrease the RF power that is transmitted if excess RF power is being received by the UE devices 210A-210D.

Figure 3:
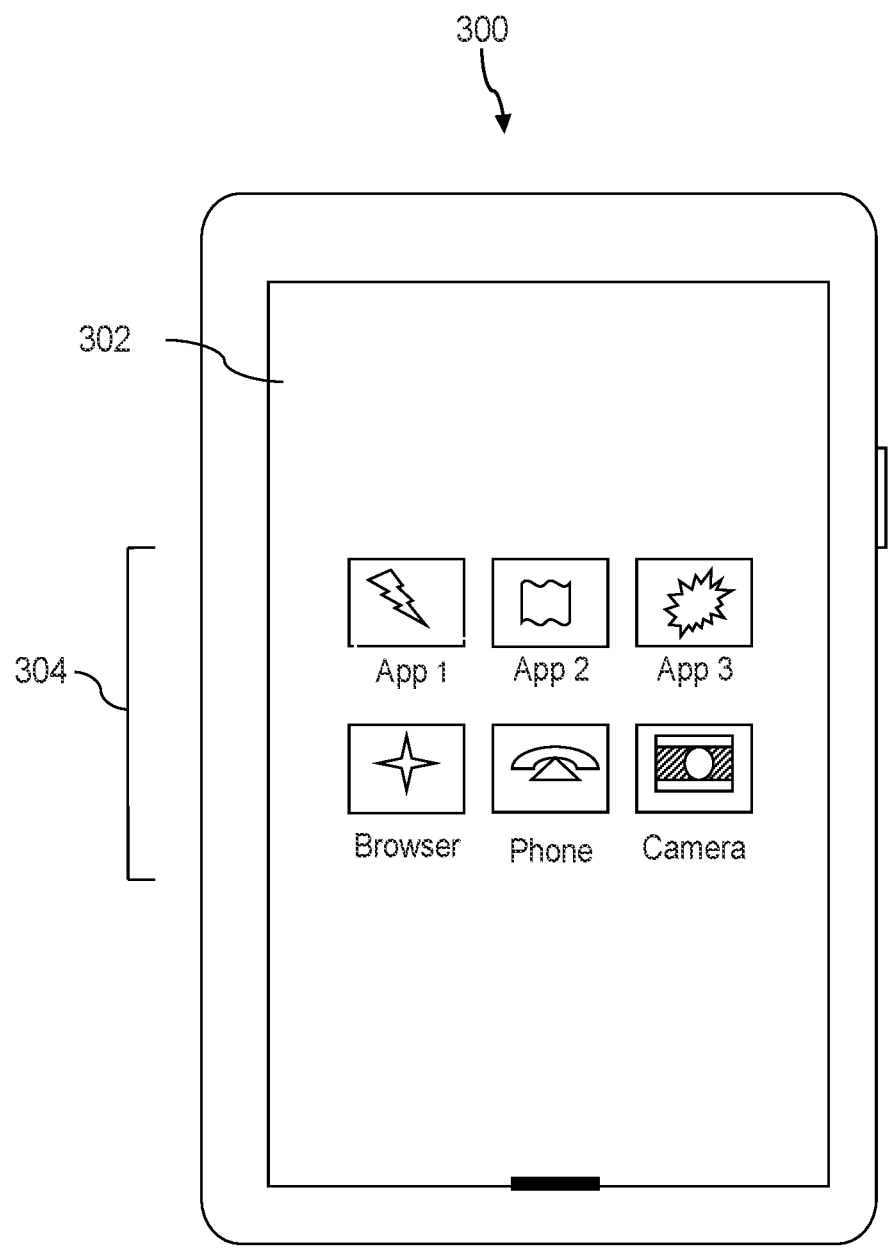
FIG. 3 is an illustration of a communications device according to an embodiment of the disclosure.

FIG. 3 depicts UE 300, which is operable for implementing aspects of the present disclosure, but the present disclosure should not be limited to these implementations. Though illustrated as a communication device, the UE 300 may take various forms including a smart vehicle, a smart appliance (for example, a smart refrigerator), a smart phone, a wearable computer, a personal digital assistant (PDA), a headset computer, a laptop computer, a notebook computer, and a tablet computer. In an example, the UE 300 may be the UE 102 in FIG. 1

The UE 300 includes a touch screen display 302 having a touch-sensitive surface for input by a user. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a wireless network access node, a peer UE 300 or any other wireless communication network or system.

Figure 4:
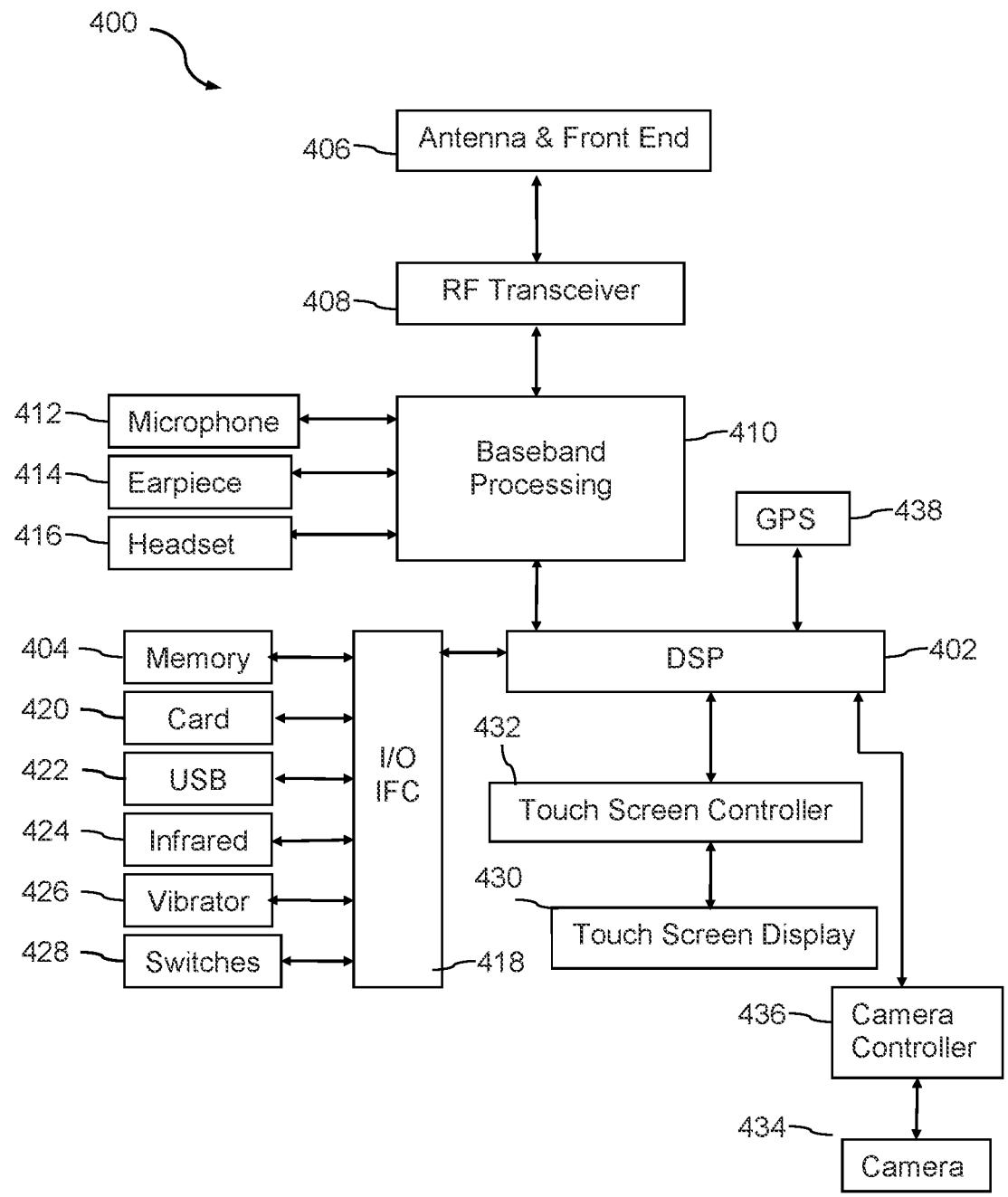
FIG. 4 is a block diagram of a hardware architecture of a communications device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, one or more radio frequency (RF) transceivers 408, a baseband processing unit 410, a microphone 412, an earpiece speaker 414, a headset port 416, an input/output (I/O) interface 418, a removable memory card 420, a Universal Serial Bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio transceivers 408 may comprise a near field communication (NFC) transceiver. The NFC transceiver may be used to complete payment transactions with point-of-sale terminals or other communicational exchanges. In an embodiment, each of the different radio transceivers 408 may be coupled to its own separate antenna. In an embodiment, the UE 400 may comprise a radio frequency identification (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touch-screen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart appliance such as a smart vehicle, a smart phone, a wearable computer, a personal digital assistant (PDA), a headset computer, a laptop computer, a notebook computer, and a tablet computer.

Figure 5:
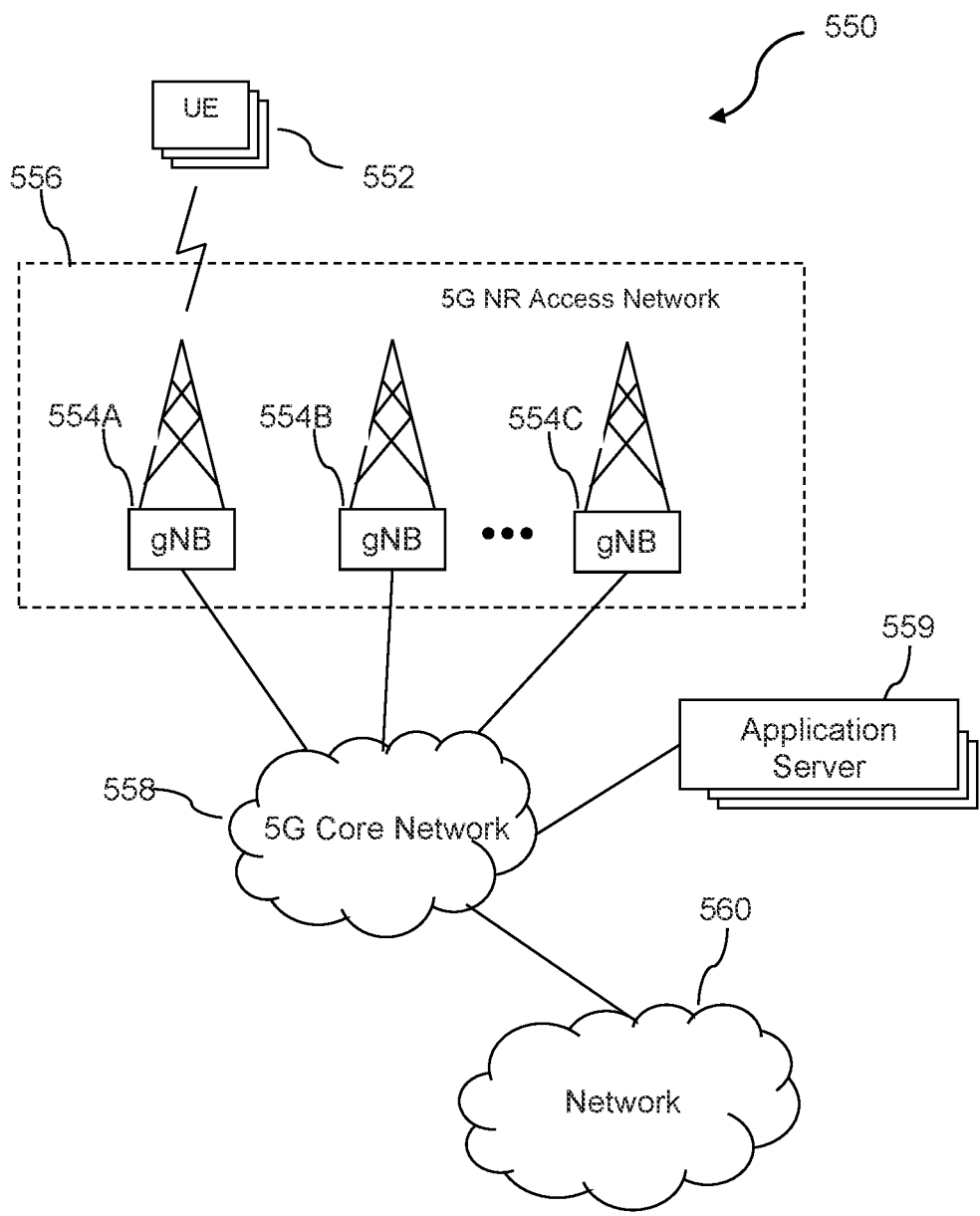
FIG. 5 is a block diagram of a communication system according to an embodiment of the disclosure.

Turning now to FIG. 5, an exemplary communication system 550 is described. Parts of the 5G communication network 118 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communication devices, tracking devices, embedded wireless modules, and/or other wirelessly equipped communication devices (whether or not user operated), can operate. The UE 552 may be the UE 102 that operates with the 5G communication network 120 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G Core Network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 560 could engage in air-interface communication with an access node 554A-554C and could thereby communicate via the access node 554A-554C with various application servers and other entities. In another embodiment, the UE 552 may be authenticated for non-3GPP access to the 5G Core Network 558 for receiving service of the 5G Core Network. In an example, the UE 552 may establish a radio communication link to the network 560 via a non-3GPP access point (AP) such as, for example, a WIFI access point. In an example, the communication link may be established according to a wireless network protocol that includes the IEEE 802.11 (WIFI) protocol. Further, the UE 552 may register and authenticate with the 5G Core Network 558 using a VPN client such as, for example, an IPsec client. Once connected via non-3GPP access, the 5G Core Network 558 may provide 5G services to the UE 552 using network functions, that include voice, data, and messaging services.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554A-554C could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The CU may be hosted in user equipment.

Figure 6:
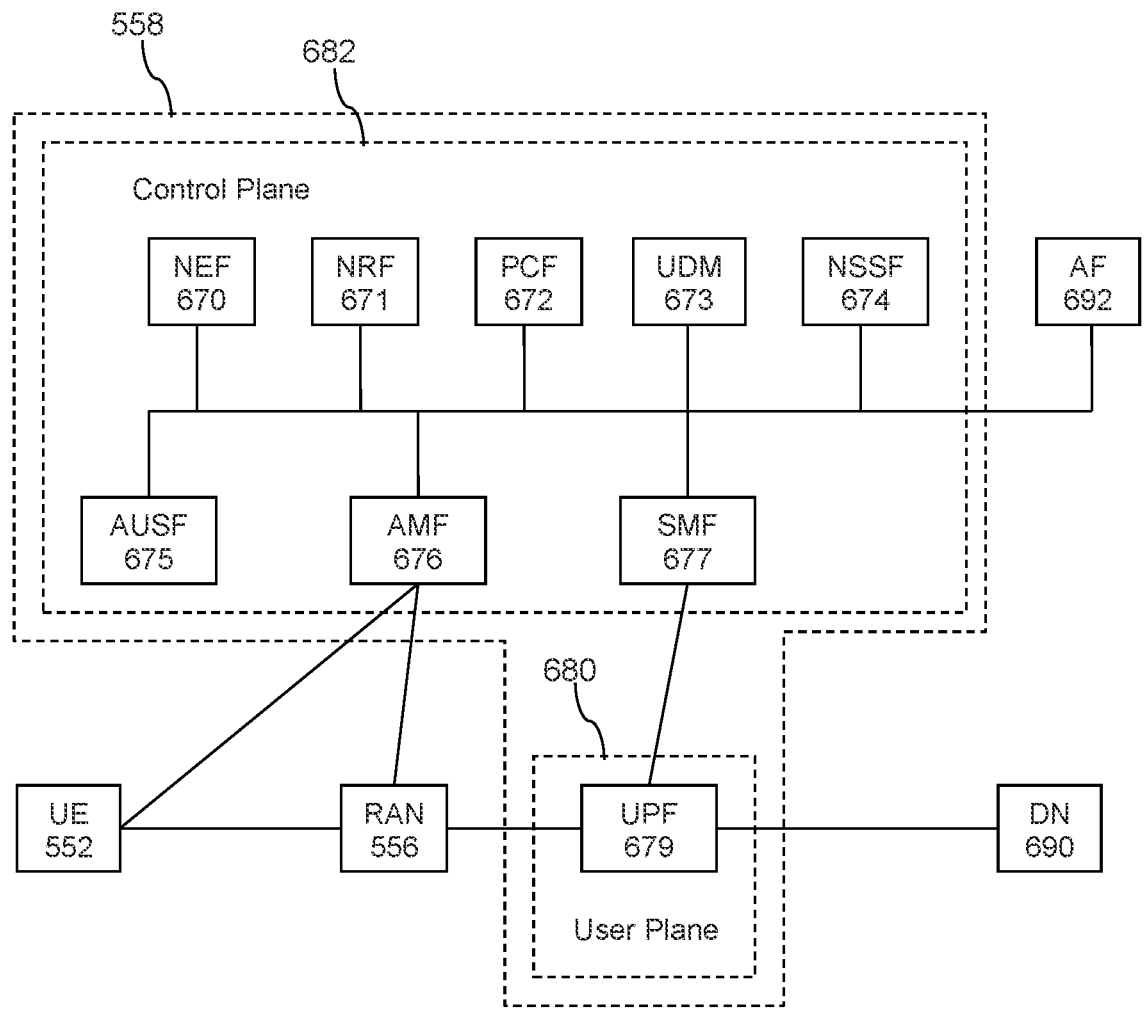
FIG. 6 is a block diagram of a core network of a communication system according to an embodiment of the disclosure.

Turning now to FIG. 6, further details of the Core Network 558 are described. In an embodiment, the Core Network 558 is a 5G Core Network. In an example, the 5G Core Network technology is based on a service-based architecture paradigm. Rather than constructing the 5G Core Network as a series of special purpose communication nodes (e.g., an HSS node, an MME node, etc.) running on dedicated server computers, the 5G Core Network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed to connect the UE 552 to the 5G Core Network for receiving voice, data, and messaging services. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G Core Network 558 may be segregated into a user plane 680 and a control plane 682, thereby promoting independent scalability, evolution, and flexible deployment.

The UPF 679 delivers packet processing and links the UE 552, via the access node 554 (in FIG. 5) of a RAN 556, to a data network 690 (e.g., the network 560 illustrated in FIG. 5 or the communication network 120 in FIG. 1). As discussed above, the UE 552 may be the UE 102 that operates with the 5G communication network 120 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the Core Network 558, exposes the application layer for interacting with the Core Network 558. In an embodiment, the application function 692 may be executed on an application server 559 located geographically proximate to the UE 552 in an "edge computing" deployment mode. The Core Network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

Figure 7:
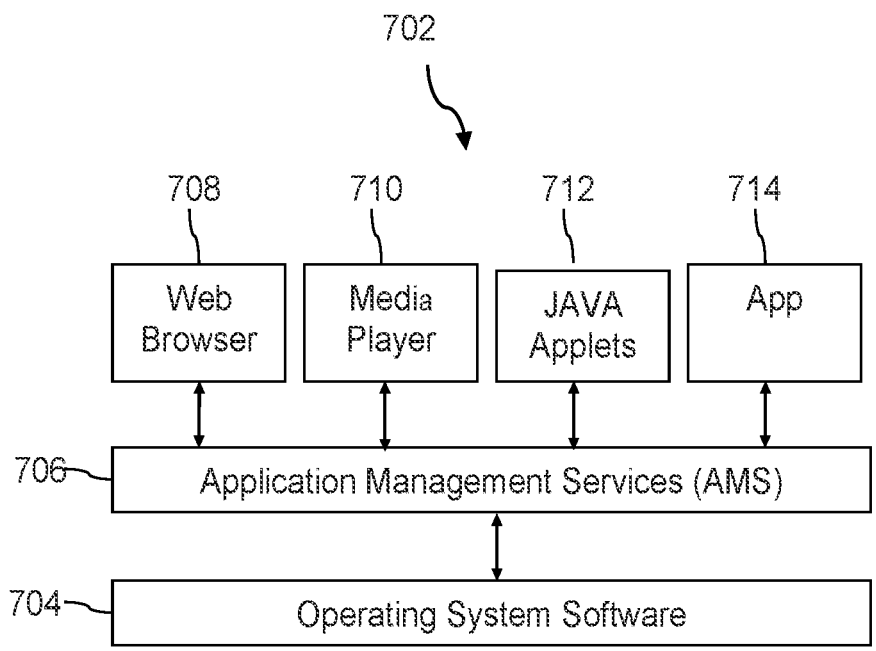
FIG. 7 is a block diagram of software architecture of a communications device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, JAVA applets 712, and an application 714 such as, for example, RFID application 110 in FIG. 1. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
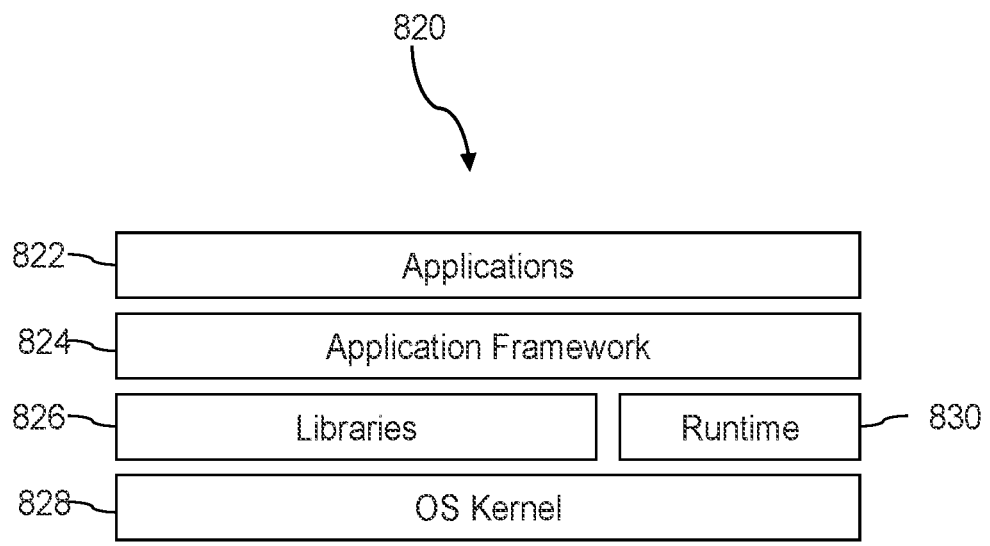
FIG. 8 is a block diagram of another software architecture of a communications device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
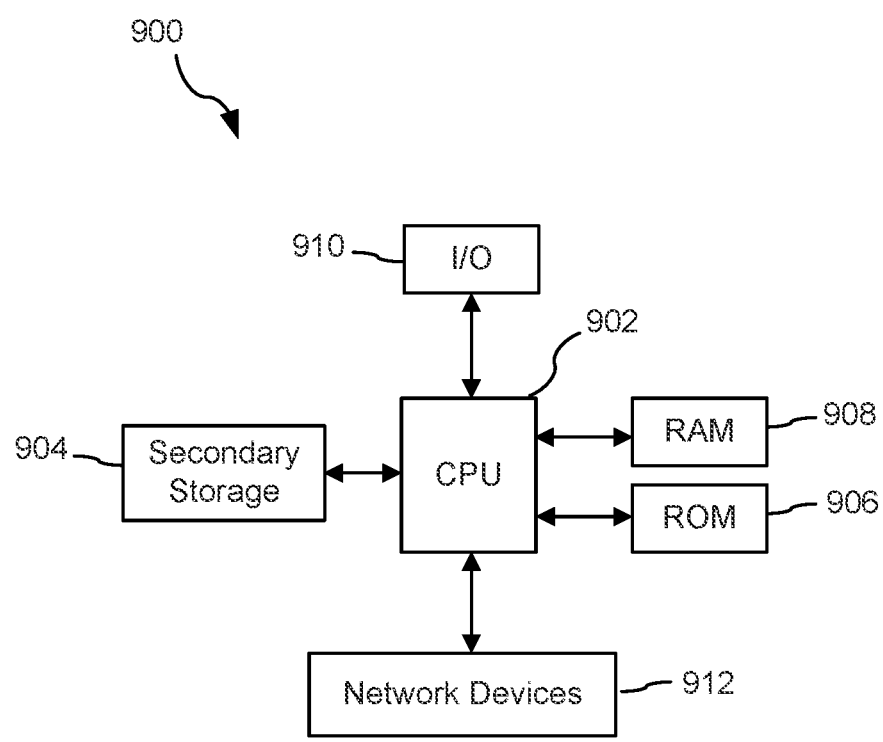
FIG. 9 is a block diagram of a computer system according to an embodiment of the disclosure.

FIG. 9 illustrates a computer system 900 suitable for implementing one or more embodiments disclosed herein.

The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, analysis server 122, or RFID reader 124. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instructions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 912 may provide wired communication links and/or wireless communication links (e.g., a first network connectivity device 912 may provide a wired communication link and a second network connectivity device 912 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, ZIGBEE, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory information.

In an embodiment, the computer system 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read-only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication device for monitoring radio frequency identification (RFID) zones in an industrial environment that is suitable for deploying RFID tags, and comprising:
   a central processing unit (CPU);
   a non-transitory memory; and
   an RFID application stored on the non-transitory memory and comprising executable instructions that when executed by the CPU, cause the communication device to be configured to:
   receive, from an RFID reader, a radio frequency (RF) signal having a first RF power level at a plurality of locations of the communication device in the industrial environment, wherein the RF signal comprises a frequency in a cellular frequency range;

receive, from an RFID tag in the industrial environment, a radio frequency (RF) backscatter signal at a location of the communication device, wherein the location of the communication device is one of the plurality of locations of the communication device in the industrial environment, wherein the backscatter signal comprises a frequency in the cellular frequency range;

determine a receive signal strength (RSS) of the RF signal at the location of the communication device;

receive, from the RFID reader, a list of a plurality of RFID tags in an RFID read zone of the industrial environment;

determine whether the RFID tag is one of the plurality of RFID tags in the list based on the RF backscatter signal; and determine adjustment of the RF signal at the location of the communication device based on a determination the RFID tag is not one of the plurality of RFID tags in the list based on the RF backscatter signal.

2. The communication device of claim 1, wherein the executable instructions further cause the communication device to be configured to send information about the RF backscatter signal to the RFID reader to enable the RFID reader to determine the adjustment of the RF signal.

3. The communication device of claim 1, wherein the executable instructions further cause the communication device to be configured to send information about the RF backscatter signal to an analysis server to enable the RFID reader to receive the adjustment of the RF signal.

4. The communication device of claim 3, wherein the executable instructions further cause the communication device to be configured to receive a second RF signal that comprises a change in direction of transmission of the RF signal.

5. The communication device of claim 3, wherein the executable instructions further cause the communication device to be configured to receive a second RF signal that comprises a change to the first RF power level.

6. The communication device of claim 3, wherein the executable instructions further cause the communication device to be configured to:
receive a second RF signal; and
generate a map of RF power levels in the RFID read zone when the RSS of the second RF signal at each location of the communication device in the RFID read zone is at least equal to an RF power level threshold.

7. The communication device of claim 1, wherein the executable instructions further cause the communication device to be configured to:
receive, from the RFID tag, a second RF backscatter signal based on the adjustment of the RF signal; and
send information about the second RF backscatter signal to the RFID reader; and
receive, from the RFID reader, whether the second RF backscatter signal is received by the RFID reader.

8. A communication device for tuning radio frequency identification (RFID) zones in an industrial environment that is suitable for deploying RFID tags, and comprising:
a central processing unit (CPU);
a non-transitory memory; and
an RFID application stored on the non-transitory memory and comprising executable instructions that when executed by the CPU, cause the communication device to be configured to:
receive a first radio frequency (RF) signal having a first RF power level from an RFID reader at a plurality of locations of the communication device in the industrial environment;
determine a receive signal strength (RSS) of the first RF signal at each of the plurality of locations of the communication device;
obtain a map of RF power levels in an RFID read zone in the industrial environment based on the RSS of the first RF signal at the plurality of locations of the communication device, wherein the map of the RFID read zone comprises a subset of the RSS for the plurality of locations of the communication device;
send the map of the RFID read zone to at least one of the RFID reader or an analysis server; and
receive, from the RFID reader, a second RF signal at one or more locations of the communication device in the RFID read zone, wherein the second RF signal is based on at least the map of the RF power levels in the RFID read zone, and wherein the second RF signal is based on tuning the first RF signal.

9. The communication device of claim 8, wherein the executable instructions further cause the communication device to be configured to send the map of the RFID read zone to the RFID reader to enable the RFID reader to determine the tuning of the first RF signal.

10. The communication device of claim 8, wherein the executable instructions further cause the communication device to be configured to send the map of the RFID read zone to the analysis server to enable the RFID reader to receive the tuning of the first RF signal from the analysis server.

11. The communication device of claim 8, wherein the executable instructions further cause the communication device to be configured to send information for tuning the first RF power level to receive the second RF signal.

12. The communication device of claim 8, wherein the executable instructions further cause the communication device to be configured to send information for tuning a direction of transmission of the first RF signal to receive the second RF signal.

13. The communication device of claim 8, wherein the executable instructions further cause the communication device to be configured to generate a second map of second RF power levels in the RFID read zone when the RSS of the second RF signal at each location of the communication device in the RFID read zone is at least equal to an RF power level threshold.

14. The communication device of claim 13, wherein the RF power level threshold is such that the RSS of the second RF signal is configured to energize an RFID tag.

15. A communication device for identifying radio frequency identification (RFID) zones in an industrial environment that is suitable for deploying RFID tags, and comprising:
a central processing unit (CPU);
a non-transitory memory; and
an RFID application stored on the non-transitory memory and comprising executable instructions that when executed by the CPU, cause the communication device to be configured to:
receive a radio frequency (RF) signal from an RFID reader at a plurality of locations of the communication device in the industrial environment, wherein the RF signal comprises a frequency in a cellular frequency range;

determine a receive signal strength (RSS) of the RF signal at the plurality of locations of the communication device; and generate a map of an RFID read zone in the industrial environment based on the RSS of the RF signal at the plurality of locations of the communication device.

16. The communication device of claim 15, wherein the map of the RFID read zone comprises at least a subset of the plurality of locations of the communication device where the RSS of the RF signal is at least equal to an RF power level threshold.

17. The communication device of claim 16, wherein the RF power level threshold is such that the RSS of the RF signal is configured to energize an RFID tag.

18. The communication device of claim 16, wherein the RSS of the RF signal in the RFID read zone enables deployment of one or more RFID tags in the RFID read zone.

19. The communication device of claim 15, wherein the executable instructions further cause the communication device to be configured to generate a map of a non RFID read zone in the industrial environment, wherein the map of the non RFID read zone comprises at least a subset of the plurality of locations of the communication device where the RSS of the RF signal is not at least equal to an RF power level threshold.

20. The communication device of claim 19, wherein the RE power level threshold is such that the RSS of the RF signal is configured to energize an RFID tag at each of the locations.

* * * * *